United States Patent
Jiang (10) Patent No.: US 11,012,887 B2
(45) Date of Patent: May 18, 2021

(54) METHOD AND DEVICE FOR REPORTING BUFFER STATE

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 68 days.

(21) Appl. No.: 16/499,239

(22) PCT Filed: Aug. 29, 2017

(86) PCT No.: PCT/CN2017/099532
§ 371 (c)(1),
(2) Date: Sep. 27, 2019

(87) PCT Pub. No.: WO2018/196243
PCT Pub. Date: Nov. 1, 2018

(65) Prior Publication Data
US 2021/0112442 A1 Apr. 15, 2021

Related U.S. Application Data

(63) Continuation of application No. PCT/CN2017/081793, filed on Apr. 25, 2017.

(51) Int. Cl.
*H04W 28/02* (2009.01)
*H04W 80/02* (2009.01)

(52) U.S. Cl.
CPC ... *H04W 28/0278* (2013.01); *H04W 28/0263* (2013.01); *H04W 28/0268* (2013.01); *H04W 80/02* (2013.01)

(58) Field of Classification Search
CPC ......... H04W 28/0278; H04W 28/0263; H04W 28/0268; H04W 80/02; H04L 47/10;
(Continued)

(56) References Cited

U.S. PATENT DOCUMENTS 8,792,440 B2  7/2014  Feuersaenger et al.
9,084,137 B2  7/2015  Feuersaenger et al.
(Continued)

FOREIGN PATENT DOCUMENTS

CN  102369778 A  3/2012
CN  104349342 A  2/2015
(Continued)

OTHER PUBLICATIONS

Rao, Jaya, and Sophie Vrzic. "Packet duplication for URLLC in 5G: Architectural enhancements and performance analysis." IEEE Network 32.2 (2018): 32-40. (Year: 2018).*
(Continued)

*Primary Examiner* — Sharad Rampuria
(74) *Attorney, Agent, or Firm* — Syncoda LLC; Feng Ma (57) ABSTRACT

A method for reporting a buffer state includes: determining a logic channel or logic channel group satisfying a BSR triggering criterion; and if the determined logic channel or logic channel group corresponds to a DRB mapped by an SDAP entity, then reporting to a base station a BSR comprising a buffer of the SDAP entity mapped to the determined logic channel or logic channel group. By determining the logic channel or logic channel group satisfying the BSR triggering criterion and, when the determined logic channel or logic channel group corresponds to the DRB mapped by the SDAP entity, and reporting to the base station the BSR comprising the buffer of the SDAP entity mapped to the determined logic channel or logic channel group, the problem with reporting the buffer state of the logic channel or logic channel group when a new protocol layer is introduced can be solved.

19 Claims, 6 Drawing Sheets

---

S201: A logical channel or a logical channel group satisfying a BSR triggering condition is determined S202: If the determined logical channel or the determined logical channel group corresponds to a DRB mapped by an SDAP entity, a BSR including a buffer of the SDAP entity mapped to the determined logical channel or the determined logical channel group is reported to a base station (58) Field of Classification Search
CPC ......... H04L 47/12; H04L 47/20; H04L 47/24; H04L 47/32; H04L 47/38; H04L 47/70; H04L 47/72; H04L 47/74; H04L 47/78; H04L 47/80
See application file for complete search history.

(56) References Cited

U.S. PATENT DOCUMENTS

| | | | |
|---|---|---|---|
| 9,439,211 | B2 | 9/2016 | Feuersaenger et al. |
| 2009/0280798 | A1 | 11/2009 | Meylan |
| 2012/0069805 | A1* | 3/2012 | Feuersanger ..... H04W 28/0278 370/329 |
| 2014/0307674 | A1 | 10/2014 | Feuersaenger et al. |
| 2015/0305061 | A1 | 10/2015 | Feuersaenger et al. |
| 2016/0337897 | A1 | 11/2016 | Feuersaenger et al. |

FOREIGN PATENT DOCUMENTS

| | | |
|---|---|---|
| CN | 104363598 A | 2/2015 |
| EP | 3226599 A1 | 10/2017 |
| WO | 2017034232 A1 | 3/2017 |

OTHER PUBLICATIONS

First Office Action of the Chinese application No. 201780000375.X, dated Apr. 1, 2020.

Huawei. 3GPP TS 37.324 Specification v1.1.1. 3GPP TSG-RAN WG2 Meeting #100 R2-1713458. Nov. 22, 2017 (Nov. 22, 2017). vol., No., entire document.

International Search Report in the international application No. PCT/CN2017/099532, dated Nov. 30, 2017.

English translation of the Written Opinion of the International Search Authority in the international application No. PCT/CN2017/099532, dated Nov. 30, 2017.

International Search Report in the international application No. PCT/CN2017/081793, dated Dec. 22, 2017.

English translation of the Written Opinion of the International Search Authority in the international application No. PCT/CN2017/081793, dated Dec. 22, 2017.

Huawei Hisilicon: "QoS Flow to DRB Re-Mapping", 3GPP Draft; R2-1702614, 3rd Generation Partnership Project (3GPP), Mobile Competence Centre ; 650, Route Des Lucioles ; F-06921 Sophia-Antipolis Cedex ; France, vol . RAN WG2, No. Spokane, Washington, USA; Apr. 3, 2017-Apr. 7, 2017 Mar. 25, 2017 (Mar. 25, 2017), XP051254183, Retrieved from the Internet URL:http://www.3gpp.org/ftp/tsg_ran/WG2_RL2/TSGR2_97bis/Docs/ retrieved on Mar. 25, 2017 * p. 4, line 1-line 14 *.

Huawei: "Data forwarding with QoS flow relocation", 3GPP Draft; R3-171072 Data Forwarding-With QOS Flow Relocation, 3rd Generation Partnership Project (3GPP), Mobile Competence Centre ; 350, Route Des Lucioles ; F-06921 Sophia-Antipolis Cedex ; France, vol . RAN WG3, No. Spokane, Washington, USA; aPR. 3, 2017-aPR. 7, 2017 mAR. 25, 2017 (Mar. 25, 2017), XP051255496, Retrieved from the Internet: URL:http://www.3gpp.org/ftp/tsg_ran/WG3_Iu/TSGR3_95bis/docs/ [retrieved on Mar. 25, 2017] * paragraph [02.3] *.

Supplementary European Search Report in the European application No. 17907455.4, dated Jan. 24, 2020.

ITL. "Considerations on SR and BSR enhancement for NR", 3GPP TSG RAN WG2 Meeting #97bis R2-1703633, dated Apr. 7, 2017, the whole document.

* cited by examiner

METHOD AND DEVICE FOR REPORTING BUFFER STATE

TECHNICAL FIELD

The present disclosure relates to a communication technology, and more particularly, to a method and device for reporting a buffer status.

BACKGROUND

In a Long-Term Evolution (LTE) system, User Equipment (UE) is required to report a buffer status of a logical channel, and the buffer status of the logical channel includes buffer statuses of a Packet Data Convergence Protocol (PDCP) entity and Radio Link Control (RLC) entity mapped to the logical channel.

With development of communication technologies, 5th Generation (5G) has emerged. A new protocol layer above an existing PDCP layer is introduced into a user plane of 5G New Radio (NR). In LTE, a bearer includes the configuration of a PDCP entity and a logical channel, and the configuration of an RLC entity and a logical channel, and thus they are considered as a whole. However, a service entity in the newly introduced protocol layer and a certain bearer has no uniquely determined relationship, the service entity is not part of the certain bearer, and a mapping relationship of the service entity and the certain bearer may be dynamically configured. Then, after the new protocol layer above the PDCP layer is introduced, how to report a buffer status of a logical channel or a logical channel group is a technical problem urgent to be solved.

SUMMARY

For solving the problem in a related art, embodiments of the present disclosure provide a method and device for reporting a buffer status, to report a buffer status of a logical channel or a logical channel group after introduction of a new protocol layer.

According to a first aspect of the embodiments of the present disclosure, a method for reporting a buffer status is provided, which may include that:

a logical channel or a logical channel group satisfying a Buffer Status Report (BSR) triggering condition is determined; and if the determined logical channel or the determined logical channel group corresponds to a Data Radio Bearer (DRB) mapped by a Service Data Adaptation Protocol (SDAP) entity, a BSR including a buffer of the SDAP entity mapped to the determined logical channel or the determined logical channel group is reported to a base station.

In an embodiment, the method may further include that:

if it is detected that the DRB mapped by the SDAP entity changes, the BSR is triggered; and the BSR is reported to the base station.

In an embodiment, the operation that the BSR is triggered if it is detected that the DRB mapped by the SDAP entity changes may include that:

if it is determined that the SDAP entity has buffer data, the BSR is triggered after it is detected that the DRB mapped by the SDAP entity changes.

In an embodiment, the operation that the BSR is triggered may include that:

a logical channel or a logical channel group corresponding to DRB before changing and a logical channel or a logical channel group corresponding to DRB after changing are determined; and the BSRs of the determined logical channels or the determined logical channel groups are triggered.

In an embodiment, the operation that the BSR is triggered may include that:

a logical channel or a logical channel group corresponding to the DRB before changing and a logical channel or a logical channel group corresponding to the DRB after changing are determined; and the BSRs of the determined logical channels or the determined logical channel groups are triggered.

In an embodiment, the method may further include that:

in the case of reporting, to the base station, the BSR including the buffer of the SDAP entity mapped to the determined logical channel or logical channel group, the SDAP entity indicates data available for transmission of the SDAP entity to a Media Access Control (MAC) entity mapped by the determined logical channel.

In an embodiment, the operation that the SDAP entity indicates the data available for transmission of the SDAP entity to the MAC entity mapped by the determined logical channel may include that:

the SDAP entity indicates the data available for transmission of the SDAP entity to the MAC entity mapped by the determined logical channel according to an indication rule of data available for transmission of a PDCP entity corresponding to the DRB.

In an embodiment, the operation that the SDAP entity indicates the data available for transmission to the MAC entity mapped by the determined logical channel may include that:

the SDAP entity indicates the data available for transmission of the SDAP entity to the PDCP entity corresponding to the DRB; and the PDCP entity deems the data available for transmission of the SDAP entity as part of data available for transmission of the PDCP entity, and indicates the data available for transmission of the PDCP entity to the MAC entity mapped by the determined logical channel according to the indication rule of the data available for transmission of the PDCP entity.

In an embodiment, the operation that the SDAP entity indicates the data available for transmission of the SDAP entity to the MAC entity mapped by the determined logical channel according to the indication rule of the data available for transmission of the PDCP entity corresponding to the DRB may include that:

if the PDCP entity deems that the data available for transmission of the PDCP entity belongs to a first logical channel in the DRB, and indicates the data available for transmission of the PDCP entity to a MAC entity corresponding to the first logical channel, the SDAP entity indicates the data available for transmission of the SDAP entity to the MAC entity corresponding to the first logical channel; or if the PDCP entity deems that the data available for transmission of the PDCP entity belongs to a second logical channel in the DRB, and indicates the data available for transmission of the PDCP entity to a MAC entity corresponding to the second logical channel, the SDAP entity indicates the data available for transmission of the SDAP entity to the MAC entity corresponding to the second logical channel; or if the PDCP entity deems that the data available for transmission of the PDCP entity belongs to both a first logical channel and a second logical channel in the DRB, and simultaneously indicates the data available for transmission of the PDCP entity to a MAC entity corresponding to the first logical channel and a MAC entity corresponding to the second logical channel, the SDAP entity simultaneously indicates the data available for transmission of the SDAP entity to the MAC entity corresponding to the first logical channel and the MAC entity corresponding to the second logical channel.

In an embodiment, the data available for transmission of the SDAP entity may include at least one of an SDAP Service Data Unit (SDU), an SDAP Packet Data Unit (PDU) and an SDAP control PDU.

According to a second aspect of the embodiments of the present disclosure, a device for reporting a buffer status is provided, which may include:

a determination module, configured to determine a logical channel or a logical channel group satisfying a BSR triggering condition; and a first reporting module, configured to, if the logical channel or logical channel group determined by the determination module corresponds to a DRB mapped by an SDAP entity, report to a base station a BSR including a buffer of the SDAP entity mapped to the determined logical channel or logical channel group.

In an embodiment, the device may further include:

a detection triggering module, configured to, if it is detected that the DRB mapped by the SDAP entity changes, trigger the BSR; and a second reporting module, configured to report the BSR triggered by the detection triggering module to the base station.

In an embodiment, the detection triggering module may be configured to:

if it is determined that the SDAP entity has buffer data, trigger the BSR after it is detected that the DRB mapped by the SDAP entity changes.

In an embodiment, the detection triggering module may include:

a determination submodule, configured to determine a logical channel or a logical channel group corresponding to DRB before changing, and determine a logical channel or a logical channel group corresponding to DRB after changing; and a triggering submodule, configured to trigger BSRs of the logical channels or the logical channel groups determined by the determination submodule.

In an embodiment, the detection triggering module may include:

the determination submodule, configured to determine a logical channel or a logical channel group corresponding to the DRB before changing, and determine a logical channel or a logical channel group corresponding to the DRB after changing; and the triggering submodule, configured to trigger the BSR of the logical channel or the logical channel group determined by the determination submodule.

In an embodiment, the device may further include:

an indication module, configured to, in the case that the first reporting module reports to the base station the BSR including the buffer of the SDAP entity mapped to the determined logical channel or the determined logical channel group, indicate data available for transmission of the SDAP entity to a MAC entity mapped by the determined logical channel.

In an embodiment, the indication module may include:

a first indication submodule, configured to indicate the data available for transmission of the SDAP entity to the MAC entity mapped by the determined logical channel according to an indication rule of data available for transmission of a PDCP entity corresponding to the DRB.

In an embodiment, the indication module may include:

a second indication submodule, configured to indicate the data available for transmission of the SDAP entity to the PDCP entity corresponding to the DRB; and a third indication submodule, configured to deem the data available for transmission of the SDAP entity, indicated by the second indication submodule, as part of its own data available for transmission, and indicate the data available for transmission of the PDCP entity to the MAC entity mapped by the determined logical channel according to the indication rule of the data available for transmission of the PDCP entity.

In an embodiment, the first indication submodule may include:

a first indication unit, configured to, if the PDCP entity deems that the data available for transmission of the PDCP entity belongs to a first logical channel in the DRB, and indicates the data available for transmission of the PDCP entity to a MAC entity corresponding to the first logical channel, indicate the data available for transmission of the SDAP entity to the MAC entity corresponding to the first logical channel; or a second indication unit, configured to, if the PDCP entity deems that the data available for transmission of the PDCP entity belongs to a second logical channel in the DRB, and indicates the data available for transmission of the PDCP entity to a MAC entity corresponding to the second logical channel, indicate the data available for transmission of the SDAP entity to the MAC entity corresponding to the second logical channel; or a third indication unit, configured to, if the PDCP entity deems that the data available for transmission of the PDCP entity belongs to both a first logical channel and a second logical channel in the DRB, and simultaneously indicates the data available for transmission of the PDCP entity to a MAC entity corresponding to the first logical channel and a MAC entity corresponding to the second logical channel, simultaneously indicate the data available for transmission of the SDAP entity to the MAC entity corresponding to the first logical channel and the MAC entity corresponding to the second logical channel.

In an embodiment, the data available for transmission of the SDAP entity may include at least one of an SDAP SDU, an SDAP PDU or an SDAP control PDU.

According to a third aspect of the embodiments of the present disclosure, a UE is provided, which may include:

a processor; and a memory configured to store an instruction executable for the processor, wherein the processor may be configured to:

determine a logical channel or logical channel group satisfying a BSR triggering condition; and if the determined logical channel or the determined logical channel group corresponds to a DRB mapped by an SDAP entity, report to a base station a BSR including a buffer of the SDAP entity mapped to the determined logical channel or the determined logical channel group.

The technical solutions provided by the embodiments of the present disclosure may have the following beneficial effects.

The logical channel or logical channel group satisfying the BSR triggering condition is determined, and when the determined logical channel or the determined logical channel group corresponds to the DRB mapped by the SDAP entity, the BSR including the buffer of the SDAP entity mapped to the determined logical channel or the determined logical channel group is reported to the base station, so that a problem about reporting a buffer status of a logical channel or a logical channel group after introduction of a new protocol layer is solved.

It is to be understood that the above general descriptions and detailed descriptions below are only exemplary and explanatory and not intended to limit the present disclosure.

BRIEF DESCRIPTION OF THE DRAWINGS

In order to describe the technical solutions in the embodiments of the present disclosure more clearly, the accompanying drawings required to be used for descriptions about the embodiments will be simply introduced below. It is apparent that the accompanying drawings described below are only some embodiments of the present disclosure. Those of ordinary skill in the art may further obtain other accompanying drawings according to these accompanying drawings without creative work.

DETAILED DESCRIPTION

The technical solutions in the embodiments of the present disclosure will be clearly and completely described below in combination with the accompanying drawings in the embodiments of the present disclosure. It is apparent that the described embodiments are not all embodiments but only part of embodiments of the present disclosure. All other embodiments obtained by those of ordinary skill in the art based on the embodiments in the present disclosure without creative work shall fall within the scope of protection of the present disclosure.

Figure 1:
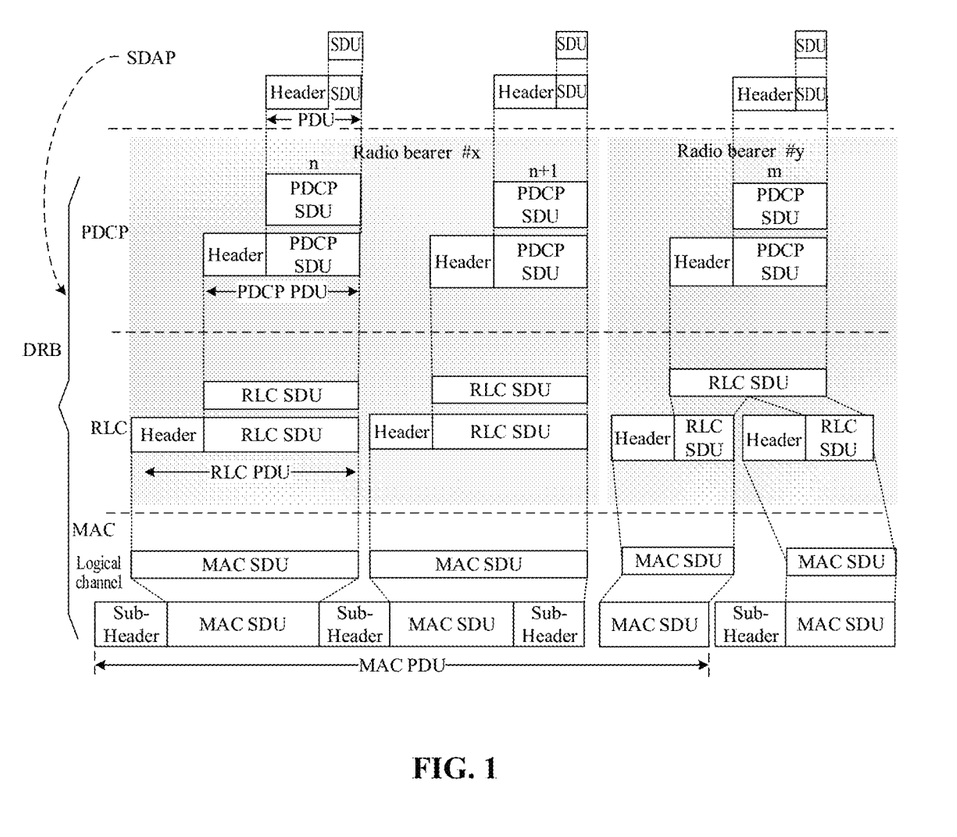
FIG. 1 is a protocol stack architecture and data flow diagram after adding an SDAP layer according to an exemplary embodiment of the present disclosure.

In the embodiments of the present disclosure, for description purposes, a newly introduced protocol layer is called an SDAP layer. The SDAP layer is located above a PDCP layer, and is responsible for mapping Quality of Service (QoS) flow of an upper-layer to a certain DRB, and a PDU of the SDAP layer is an SDU of the PDCP layer. A protocol stack architecture and data flow diagram after adding the SDAP layer is shown in FIG. 1. The SDAP layer may include multiple PDU sessions, each PDU session corresponds to an SDAP entity, and the SDAP entity refers to a logical subject processing a PDU session service. A mapping relationship between uplink data of the PDU session and a DRB has the following statuses: a first status: the uplink data of the PDU session is mapped to a certain DRB; a second status: a network configures reflective QoS, namely the uplink data and downlink data of the PDU session are mapped to the same DRB; and a third status: the uplink data of the PDU session is mapped to a default DRB.

An SDAP entity includes multiple QoS flows, and different QoS flows may be mapped to the same DRB or different DRBs. A DRB corresponds to a PDCP configuration, one or more RLC configurations and one or more logical channel configurations. A present standard protocol supports that a DRB at most corresponds to two RLC configurations and two logical channel configurations (one logical channel corresponds to one RLC configuration, and they correspond one to one). Two RLC configurations or logical channels may correspond to the same MAC entity or two different MAC entities (Master Cell Group (MCG) MAC or Secondary Cell Group (SCG) MAC).

Since an SDAP entity and a DRB has no uniquely determined mapping relationship, UE is required to report a buffer status of a logical channel or a logical channel group according to a mapping relationship between SDAP and a DRB. An implementation process of the present disclosure will be described below in combination with specific embodiments in detail.

Figure 2:
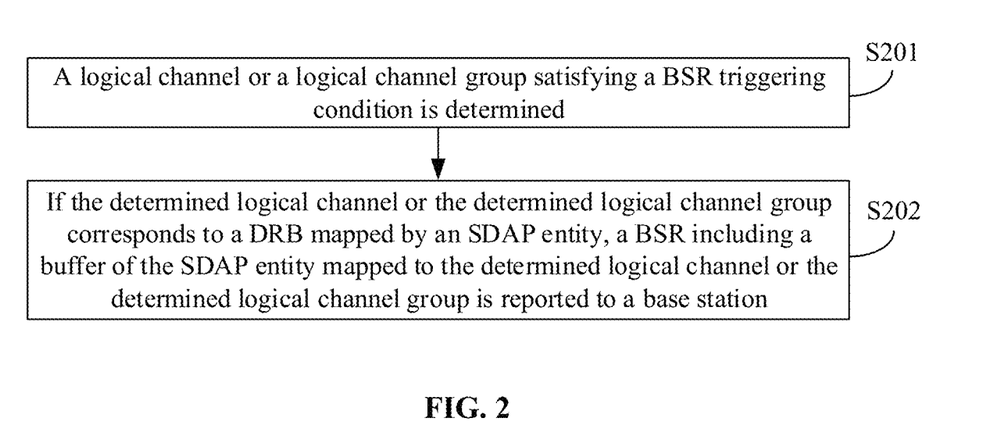
FIG. 2 is a flow chart showing a method for reporting a buffer status according to an exemplary embodiment of the present disclosure.

FIG. 2 is a flow chart showing a method for reporting a buffer status according to an exemplary embodiment of the present disclosure. The method embodiment is described from a UE side. As shown in FIG. 2, the method for reporting a buffer status includes the following steps.

In S201, a logical channel or a logical channel group satisfying a BSR triggering condition is determined.

In the embodiment, UE may have multiple logical channels or logical channel groups, and when one or some logical channels or logical channel groups satisfy the BSR triggering condition, identification information of the logical channels or logical channel groups satisfying the BSR triggering condition is determined.

In S202, if the determined logical channel or the determined logical channel group corresponds to a DRB mapped by an SDAP entity, a BSR including a buffer of the SDAP entity mapped to the determined logical channel or logical channel group is reported to a base station.

Since the SDAP entity and a DRB have no uniquely determined mapping relationship, whether the logical channel or logical channel group satisfying the BSR triggering condition corresponds to the DRB mapped by the SDAP entity or not is required to be checked after the logical channel or logical channel group satisfying the BSR triggering condition is determined, and if the logical channel or logical channel group satisfying the BSR triggering condition corresponds to the DRB mapped by the SDAP entity, the UE reports the BSR including the buffer of the SDAP entity mapped to the determined logical channel or the determined logical channel group to the base station, namely the BSR reported by the UE includes a total buffer status of an RLC entity, PDCP entity and SDAP entity mapped to the determined logical channel or the determined logical channel group.

If the logical channel or logical channel group satisfying the BSR triggering condition does not correspond to the DRB mapped by the SDAP entity, the BSR reported to the base station by the UE does not include the BSR of the buffer of the SDAP entity.

Figure 3:
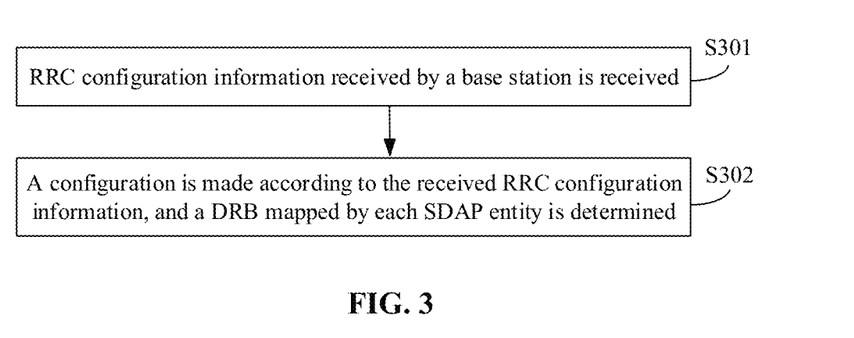
FIG. 3 is a flow chart showing determination of a DRB mapped by an SDAP entity according to an exemplary embodiment of the present disclosure.

In addition, before S202 is executed, the method may further include that: the DRB mapped by the SDAP entity is determined. As shown in FIG. 3, the DRB mapped by the SDAP entity may be determined through the following steps.

In S301, Radio Resource Control (RRC) configuration information transmitted by the base station is received.

The RRC configuration information may include configuration information of SDAP layer, and the configuration information of SDAP layer may include, but not limited to, a DRB mapped by a QoS flow and the like.

In S302, a configuration is made according to the received RRC configuration information, and the DRB mapped by each SDAP entity is determined.

The SDAP entity maps the QoS flow to the DRB, so that the DRB mapped by the SDAP entity may be determined according to the DRB mapped by the QoS flow. For example, if an SDAP entity 1 maps a QoS flow to a DRB1 and an SDAP entity 2 maps a QoS flow to a DRB2, it may be determined that a DRB mapped by the SDAP entity 1 is the DRB1 and a DRB mapped by the SDAP entity 2 is the DRB2.

According to the embodiment, the logical channel or logical channel group satisfying the BSR triggering condition is determined, and when the determined logical channel or the determined logical channel group corresponds to the DRB mapped by the SDAP entity, the BSR including the buffer of the SDAP entity mapped to the determined logical channel or the determined logical channel group is reported to the base station, so that a problem about reporting a buffer status of a logical channel or a logical channel group after introduction of a new protocol layer is solved.

Figure 4A:
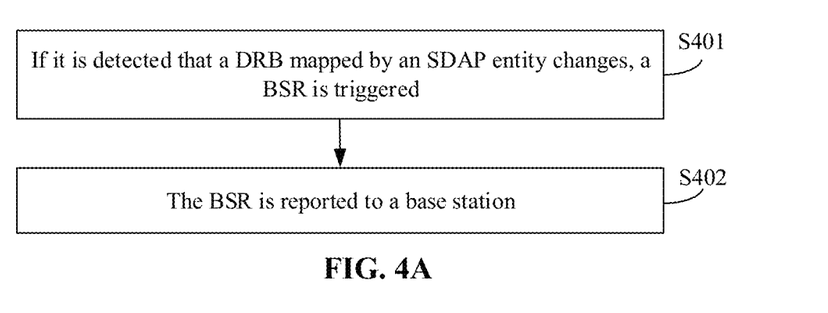
FIG. 4A is a flow chart showing another method for reporting a buffer status according to another exemplary embodiment of the present disclosure.

FIG. 4A is a flow chart showing another method for reporting a buffer status according to an exemplary embodiment of the present disclosure. As shown in FIG. 4A, the method may further include the following steps.

In S401, if it is detected that the DRB mapped by the SDAP entity changes, the BSR is triggered.

In the embodiment, if the changing DRB affects a buffer status of the corresponding logical channel or logical channel group, the BSR of the affected logical channel or the affected logical channel group is triggered. That is, a logical channel or a logical channel group corresponding to DRB before changing, and a logical channel or a logical channel group corresponding to DRB after changing are determined at first, and then BSRs of the determined logical channels or the determined logical channel groups are triggered.

The UE may receive updated configuration information to change the DRB mapped by the SDAP entity. For example, the updated configuration information may indicate DRBs update mapped by one or some SDAP entities. For another example, for reflective QoS, if the base station remaps a downlink QoS flow to a new DRB, it is indicated that the uplink QoS flow is also remapped to the new DRB.

Preferably, if it is determined that the SDAP entity has buffer data, the BSR is triggered after it is detected that the DRB mapped by the SDAP entity changes. This is because, if the SDAP entity has the buffer data, the SDAP entity is remapped from one DRB to another DRB, and buffer statuses of logical channel or logical channel group corresponding to the original DRB and the new DRB may both change. In such case, the logical channel or logical channel group corresponding to the DRB before changing and the logical channel or logical channel group corresponding to the DRB after changing are determined at first, and then the BSR of the determined logical channel or the determined logical channel group is triggered.

In S402, the BSR is reported to the base station.

After the BSR are triggered, the BSR may be reported to the base station.

According to the embodiment, when it is detected that the DRB mapped by the SDAP entity changes, the BSR is triggered, and the triggered BSR is reported, so that a problem about reporting the buffer status of the logical channel or the logical channel group when the DRB mapped by the SDAP entity changes is solved.

Figure 4B:
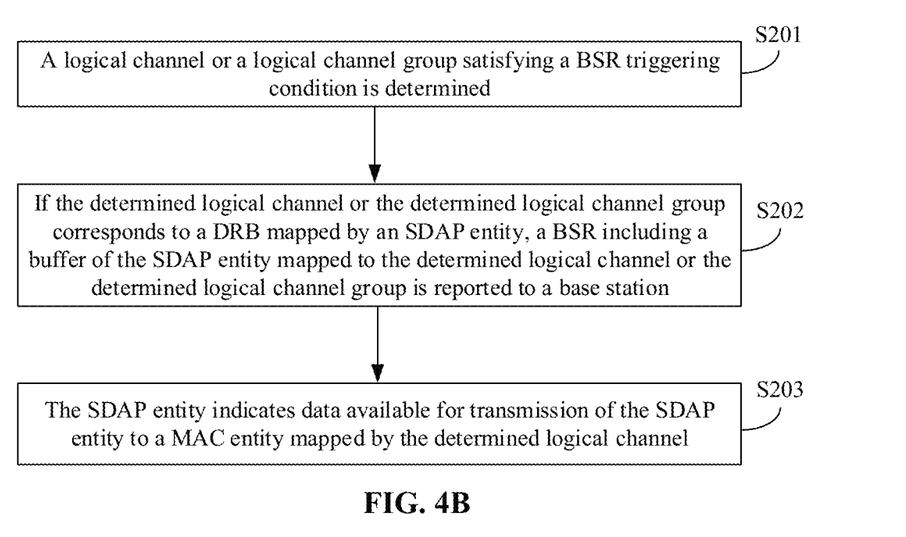
FIG. 4B is a flow chart showing another method for reporting a buffer status according to another exemplary embodiment of the present disclosure.

FIG. 4B is a flow chart showing another method for reporting a buffer status according to an exemplary embodiment of the present disclosure. As shown in FIG. 4B, when S202 is executed, the method may further include the following step.

In S203, the SDAP entity indicates data available for transmission of the SDAP entity to a MAC entity mapped by the determined logical channel.

The data available for transmission of the SDAP entity may include at least one of: a) an SDAP SDU, if the SDAP SDU has not been processed by the SDAP layer; b) an SDAP PDU, if the SDAP SDU has been processed to generate the PDU; and c) an SDAP control PDU (if the control PDU is established in a standard).

In the embodiment, the data available for transmission of the SDAP entity may be indicated to the MAC entity mapped by the determined logical channel in two manners.

In a first manner: the SDAP entity indicates the data available for transmission of the SDAP entity to the MAC entity mapped by the determined logical channel according to an indication rule of data available for transmission of a PDCP entity corresponding to the DRB.

A PDCP entity of a DRB, when it indicates the size of data available for transmission to a MAC layer, indicates the size of data available for transmission corresponding to each logical channel of the DRB (based on a MAC entity that the logical channel belongs to, indicating to the corresponding MAC entity). The PDCP layer indicates the data available for transmission to MAC in the following indication manners (different indication manners are adopted for specific scenarios, which is not elaborated herein): 1: all the data available for transmission is included in a specified logical channel and is indicated to the MAC corresponding to the logical channel (if two logical channels are configured to the DRB, the data available for transmission is indicated to the specified logical channel, and 0 is indicated to the other logical channel); and 2: all the data available for transmission is included in the two logical channels and is indicated to the MAC entities corresponding to the two logical channels, the data available for transmission being indicated to the two logical channels.

For the first manner, the following three conditions may be included:

Condition 1): if the PDCP entity deems that the data available for transmission of the PDCP entity belongs to a first logical channel in the DRB, and indicates the data available for transmission of the PDCP entity to a MAC entity corresponding to the first logical channel, the SDAP entity indicates the data available for transmission of the SDAP entity to the MAC entity corresponding to the first logical channel.

For example, if the DRB includes one logical channel, it is hypothetically called a logical channel A, and if the DRB includes two logical channels, they are hypothetically called a logical channel A and a logical channel B respectively. If the PDCP entity determines that the data available for transmission belongs to the logical channel A, and indicates the data available for transmission to a MAC entity corresponding to the logical channel A (data indicated to a MAC entity corresponding to the logical channel B and belonging to the logical channel B is 0), the SDAP entity also deems that the data available for transmission belongs to the logical channel A, and indicates the data available for transmission to the MAC entity corresponding to the logical channel A. That is, if the PDCP entity indicates the data available for transmission to MCG MAC only, the SDAP entity also indicates the data available for transmission to the MCG MAC only.

Condition 2): if the PDCP entity deems that the data available for transmission of the PDCP entity belongs to a second logical channel in the DRB, and indicates the data available for transmission of the PDCP entity to a MAC entity corresponding to the second logical channel, the SDAP entity indicates the data available for transmission of the SDAP entity to the MAC entity corresponding to the second logical channel.

Descriptions are still made with the above example. If the PDCP entity determines that the data available for transmission belongs to the logical channel B, and indicates the data available for transmission to the MAC entity corresponding to the logical channel B (the data indicated to the entity corresponding to the logical channel A and belonging to the logical channel A is 0), the SDAP entity also deems that the data available for transmission belongs to the logical channel B, and indicates the data available for transmission to the MAC entity corresponding to the logical channel B.

Condition 3): if the PDCP entity deems that the data available for transmission of the PDCP entity belongs to both a first logical channel and a second logical channel in the DRB, and simultaneously indicates the data available for transmission of the PDCP entity to the MAC entity corresponding to the first logical channel and the MAC entity corresponding to the second logical channel, the SDAP entity simultaneously indicates the data available for transmission of the SDAP entity to the MAC entity corresponding to the first logical channel and the MAC entity corresponding to the second logical channel.

Descriptions are still made with the above example. If the PDCP entity deems that the data available for transmission belongs to both the logical channels A and B, and simultaneously indicates the data available for transmission to the MAC entities corresponding to the logical channels A and B (the data belonging to the logical channels A and B is the same and is the data available for transmission of the PDCP layer), the SDAP entity also deems that the data available for transmission belongs to both the logical channels A and B and simultaneously indicates the data available for transmission to the MAC entities corresponding to the logical channels A and B.

Thus it can be seen that, in the embodiment, the SDAP entity may implement corresponding indication according to different indication manners adopted by the PDCP entity, which may be applied to multiple scenarios and implemented simply.

In a second manner: the SDAP entity indicates the data available for transmission of the SDAP entity to the PDCP entity corresponding to the DRB, and the PDCP entity deems the data available for transmission of the SDAP entity as part of data available for transmission of the PDCP entity and indicates the data available for transmission of the PDCP entity to the MAC entity mapped by the determined logical channel according to an indication rule of data available for transmission of the PDCP entity.

Thus it can be seen that, according to the embodiment, the data available for transmission of the SDAP entity may be indicated to the MAC entity mapped by the determined logical channel in the two manners, and implementation manners are flexible and diversified.

According to the above embodiment, the SDAP entity indicates the data available for transmission of the SDAP entity to the MAC entity mapped by the determined logical channel to report the BSR. Corresponding to the embodiments of the above method for reporting buffer status, the present disclosure also provides a device for reporting a buffer status embodiment.

Figure 5:
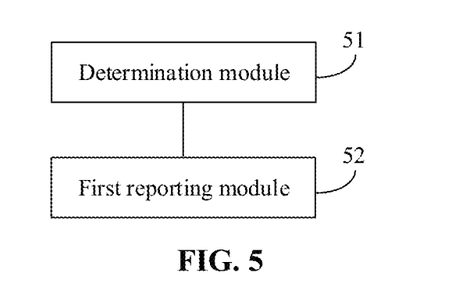
FIG. 5 is a block diagram of a device for reporting a buffer status according to an exemplary embodiment of the present disclosure.

FIG. 5 is a block diagram of a device for reporting a buffer status according to an exemplary embodiment. As shown in FIG. 5, the device for reporting a buffer status includes a determination module 51 and a first reporting module 52.

The determination module 51 is configured to determine a logical channel or logical channel group satisfying a BSR triggering condition.

In the embodiment, UE may have multiple logical channels or logical channel groups, and when one or some logical channels or logical channel groups satisfy the BSR triggering condition, identification information of the logical channels or logical channel groups satisfying the BSR triggering condition is determined.

The first reporting module 52 is configured to, if the logical channel or logical channel group determined by the determination module 51 corresponds to a DRB mapped by an SDAP entity, report to a base station a BSR including a buffer of the SDAP entity mapped to the determined logical channel or the determined logical channel group.

Since the SDAP entity and a DRB has no uniquely determined mapping relationship, whether the logical channel or logical channel group satisfying the BSR triggering condition corresponds to the DRB mapped by the SDAP entity or not is required to be checked after the logical channel or logical channel group satisfying the BSR triggering condition is determined, and if the logical channel or logical channel group satisfying the BSR triggering condition corresponds to the DRB mapped by the SDAP entity, the UE reports to the base station the BSR including the buffer of the SDAP entity mapped to the determined logical channel or logical channel group, namely the BSR reported by the UE includes a total buffer status of an RLC entity, PDCP entity and SDAP entity mapped to the determined logical channel or logical channel group.

If the logical channel or logical channel group satisfying the BSR triggering condition does not correspond to the DRB mapped by the SDAP entity, the BSR reported to the base station by the UE is the BSR without the buffer of the SDAP entity.

In addition, the first reporting module 52 may further determine the DRB mapped by the SDAP entity, and an implementation manner may refer to the embodiment shown in FIG. 3.

The device shown in FIG. 5 is configured to implement the method flow shown in FIG. 2, and the same descriptions are made to involved related contents and will not be elaborated herein.

According to the embodiment, the logical channel or logical channel group satisfying the BSR triggering condition is determined, and when the determined logical channel or logical channel group corresponds to the DRB mapped by the SDAP entity, the BSR including the buffer of the SDAP entity mapped to the determined logical channel or the determined logical channel group is reported to the base station, so that a problem about reporting a buffer status of a logical channel or a logical channel group after introduction of a new protocol layer is solved.

Figure 6:
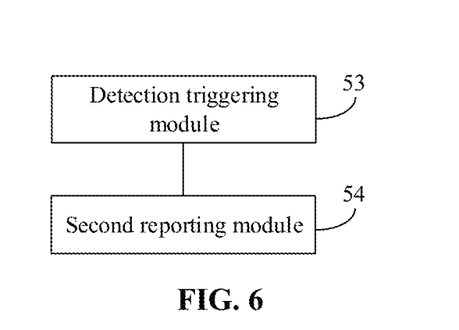
FIG. 6 is a block diagram of another device for reporting a buffer status according to another exemplary embodiment of the present disclosure.

FIG. 6 is a block diagram of another device for reporting a buffer status according to an exemplary embodiment. As shown in FIG. 6, based on the embodiment shown in FIG. 5, the device may include a detection triggering module 53 and a second reporting module 54.

The detection triggering module 53 is configured to, if it is detected that the DRB mapped by the SDAP entity changes, trigger the BSR.

In the embodiment, if the changing DRB affects a buffer status of the corresponding logical channel or logical channel group, the BSR of the affected logical channel or the affected logical channel group is triggered. That is, a logical channel or a logical channel group corresponding to DRB before changing and a logical channel or a logical channel group corresponding to DRB after changing are determined at first, and then BSRs of the determined logical channel or the determined logical channel group is triggered.

The second reporting module 54 is configured to report the BSR triggered by the detection triggering module 53 to the base station.

In a preferred embodiment, the detection triggering module 53 may be configured to, if it is determined that the SDAP entity has buffer data, trigger the BSR after it is detected that the DRB mapped by the SDAP entity changes. This is because, if the SDAP entity has the buffer data, the SDAP entity is remapped from one DRB to another DRB, and buffer statuses of logical channels or logical channel groups corresponding to the original DRB and the new DRB may both change. In such case, the logical channel or logical channel group corresponding to the DRB before changing and the logical channel or logical channel group corresponding to the DRB after changing are determined at first, and then the BSR of the determined logical channel or the determined logical channel group is triggered.

According to the embodiment, when it is detected that the DRB mapped by the SDAP entity changes, the BSR is triggered, and the triggered BSR is reported, so that a problem about reporting the buffer status of the logical channel or the logical channel group when the DRB mapped by the SDAP entity changes is solved.

Figure 7A:
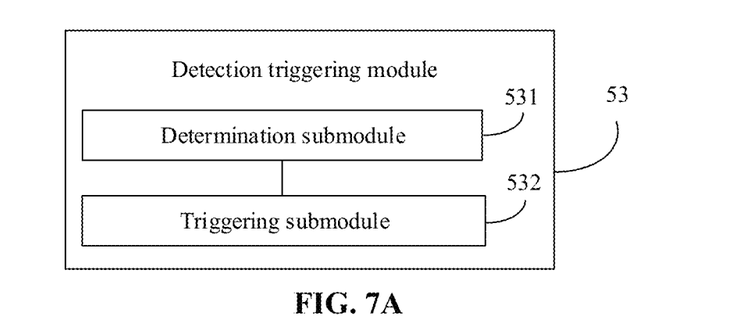
FIG. 7A is a block diagram of another device for reporting a buffer status according to another exemplary embodiment of the present disclosure.

FIG. 7A is a block diagram of another device for reporting a buffer status according to another exemplary embodiment. As shown in FIG. 7A, based on the embodiment shown in FIG. 6, the detection triggering module 53 may include a determination submodule 531 and a triggering submodule 532.

The determination submodule 531 is configured to determine the logical channel or logical channel group corresponding to the DRB before changing and the logical channel or logical channel group corresponding to the DRB after changing.

The triggering submodule 532 is configured to trigger the BSR of the logical channel or logical channel group determined by the determination submodule 531.

According to the embodiment, the logical channel or logical channel group corresponding to the DRB before changing and the logical channel or logical channel group corresponding to the DRB after changing are determined, and then the BSR of the determined logical channel or the determined logical channel group are triggered, so that the BSR is triggered when the DRB mapped by the SDAP entity changes.

Figure 7B:
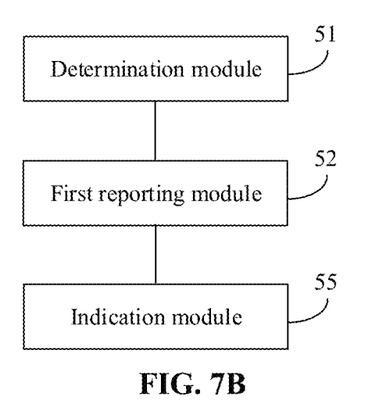
FIG. 7B is a block diagram of another device for reporting a buffer status according to another exemplary embodiment of the present disclosure.

FIG. 7B is a block diagram of another device for reporting a buffer status according to an exemplary embodiment. As shown in FIG. 7B, based on the embodiment shown in FIG. 5, the device may further include an indication module 55.

The indication module 55 is configured to, when the first reporting module 52 reports to the base station the BSR including the buffer of the SDAP entity mapped to the determined logical channel or logical channel group, indicate data available for transmission of the SDAP entity to a MAC entity mapped by the determined logical channel.

The data available for transmission of the SDAP entity may include at least one of: a) an SDAP SDU, if the SDAP SDU has not been processed by the SDAP layer; b) an SDAP PDU, if the SDAP SDU has been processed to generate the PDU; and c) an SDAP control PDU (if the control PDU is established in a standard).

In the embodiment, the indication module 55 is located in an SDAP layer, namely the SDAP entity indicates the data available for transmission of the SDAP entity to the MAC entity mapped by the determined logical channel.

According to the embodiment, the SDAP entity indicates the data available for transmission of the SDAP entity to the MAC entity mapped by the determined logical channel to report the BSR.

Figure 7C:
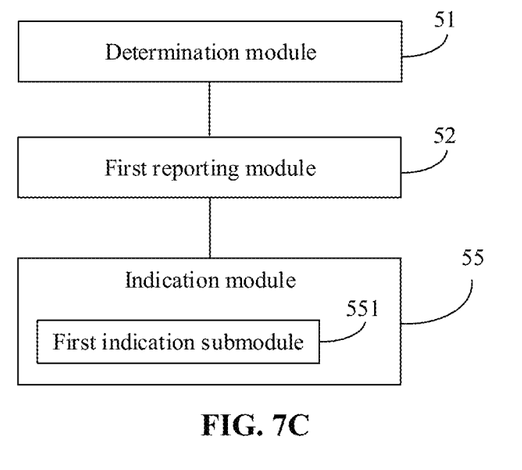
FIG. 7C is a block diagram of another device for reporting a buffer status according to another exemplary embodiment of the present disclosure.

FIG. 7C is a block diagram of another device for reporting a buffer status according to an exemplary embodiment. As shown in FIG. 7C, based on the embodiment shown in FIG. 7B, the indication module 55 may include a first indication submodule 551.

The first indication submodule 551 is configured to indicate the data available for transmission of the SDAP entity to the MAC entity mapped by the determined logical channel according to an indication rule of data available for transmission of a PDCP entity corresponding to the DRB.

According to the embodiment, the data available for transmission of the SDAP entity may be indicated to the MAC entity mapped by the determined logical channel according to an indication rule of data available for transmission of a PDCP entity corresponding to the DRB, and an implementation manner is simple.

Figure 7D:
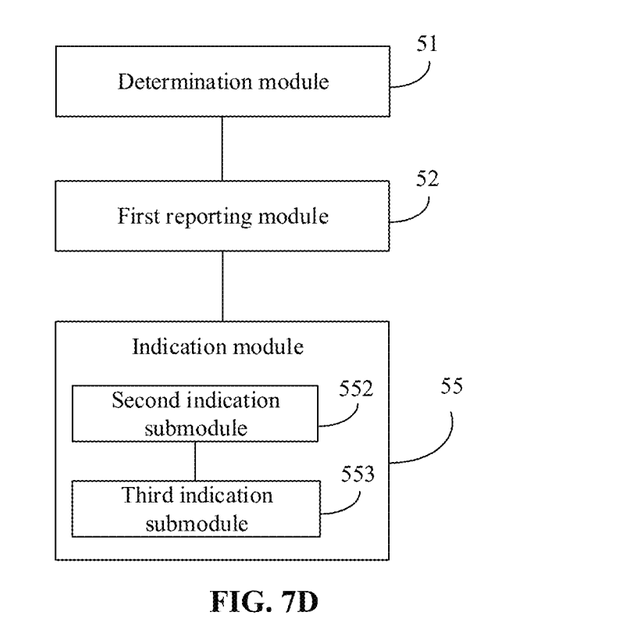
FIG. 7D is a block diagram of another device for reporting a buffer status according to another exemplary embodiment of the present disclosure.

FIG. 7D is a block diagram of another device for reporting a buffer status according to an exemplary embodiment. As shown in FIG. 7D, based on the embodiment shown in FIG. 7B, the indication module 55 may include a second indication submodule 552 and a third indication submodule 553.

The second indication submodule 552 is configured to indicate the data available for transmission of the SDAP entity to the PDCP entity corresponding to the DRB.

The second indication submodule 552 is located in the SDAP layer.

The third indication submodule 553 is configured to deem the data available for transmission of the SDAP entity, indicated by the second indication submodule 552, as part of its own data available for transmission, and indicate the data available for transmission of the PDCP entity to the MAC entity mapped by the determined logical channel according to the indication rule of the data available for transmission of the PDCP entity.

The third indication submodule 553 is located in a PDCP layer.

According to the embodiment, the data available for transmission of the SDAP entity is indicated to the PDCP entity corresponding to the DRB, the data available for transmission of the SDAP entity, indicated by the second indication submodule, is determined as part of its own data available for transmission, and the data available for transmission of the PDCP entity is indicated to the MAC entity mapped by the determined logical channel according to an indication rule of the data available for transmission of the PDCP entity. An implementation manner is simple.

Figure 7E:
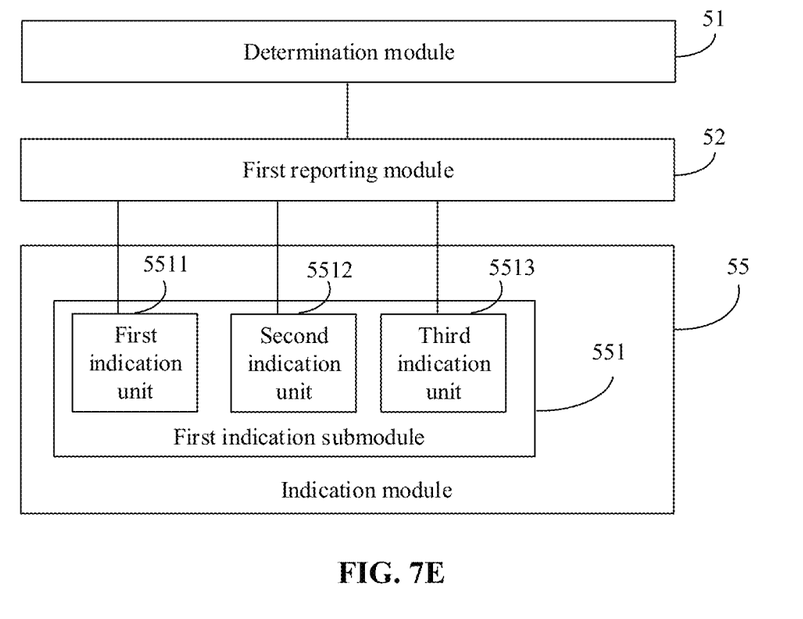
FIG. 7E is a block diagram of another device for reporting a buffer status according to another exemplary embodiment of the present disclosure.

FIG. 7E is a block diagram of another device for reporting a buffer status according to an exemplary embodiment. As shown in FIG. 7E, based on the embodiment shown in FIG. 7C, the first indication submodule 551 may include a first indication unit 5511, a second indication unit 5512 or a third indication unit 5513.

The first indication unit 5511 is configured to, if the PDCP entity deems that the data available for transmission of the PDCP entity belongs to a first logical channel in the DRB, and indicates the data available for transmission of the PDCP entity to a MAC entity corresponding to the first logical channel, indicate the data available for transmission of the SDAP entity to the MAC entity corresponding to the first logical channel.

For example, if the DRB includes one logical channel, it is hypothetically called a logical channel A, and if the DRB includes two logical channels, they are hypothetically called a logical channel A and a logical channel B respectively. If the PDCP entity deems that the data available for transmission belongs to the logical channel A and indicates the data available for transmission to a MAC entity corresponding to the logical channel A (data indicated to a MAC entity corresponding to the logical channel B and belonging to the logical channel B is 0), the SDAP entity also deems that the data available for transmission belongs to the logical channel A and indicates the data available for transmission to the MAC entity corresponding to the logical channel A. That is, if the PDCP entity indicates the data available for transmission to MCG MAC only, the SDAP entity also indicates the data available for transmission to the MCG MAC only.

The second indication unit 5512 is configured to, if the PDCP entity deems that the data available for transmission of the PDCP entity belongs to a second logical channel in the DRB, and indicates the data available for transmission of the PDCP entity to a MAC entity corresponding to the second logical channel, indicate the data available for transmission of the SDAP entity to the MAC entity corresponding to the second logical channel.

Descriptions are still made with the above example. If the PDCP entity deems that the data available for transmission belongs to the logical channel B and indicates the data available for transmission to the MAC entity corresponding to the logical channel B (the data indicated to the entity corresponding to the logical channel A and belonging to the logical channel A is 0), the SDAP entity also determines that the data available for transmission belongs to the logical channel B, and indicates the data available for transmission to the MAC entity corresponding to the logical channel B.

The third indication unit 5513 is configured to, if the PDCP entity deems that the data available for transmission of the PDCP entity belongs to both the first logical channel and second logical channel in the DRB, and simultaneously indicates the data available for transmission of the PDCP entity to the MAC entity corresponding to the first logical channel and the MAC entity corresponding to the second logical channel, simultaneously indicate the data available for transmission of the SDAP entity to the MAC entity corresponding to the first logical channel and the MAC entity corresponding to the second logical channel.

Descriptions are still made with the above example. If the PDCP entity determines that the data available for transmission belongs to both the logical channels A and B, and simultaneously indicates the data available for transmission to the MAC entities corresponding to the logical channels A and B (the data belonging to the logical channels A and B is the same and is the data available for transmission of the PDCP layer), the SDAP entity also deems that the data available for transmission belongs to both the logical channels A and B and simultaneously indicates the data available for transmission to the MAC entities corresponding to the logical channels A and B.

In the embodiment, the SDAP entity may implement corresponding indication according to different indication manners adopted by the PDCP entity, which may be applied to multiple scenarios and implemented simply.

With respect to the device in the above embodiment, the specific manners for performing operations for individual modules and submodules therein have been described in detail in the embodiment regarding the method, which will not be elaborated herein.

Figure 8:
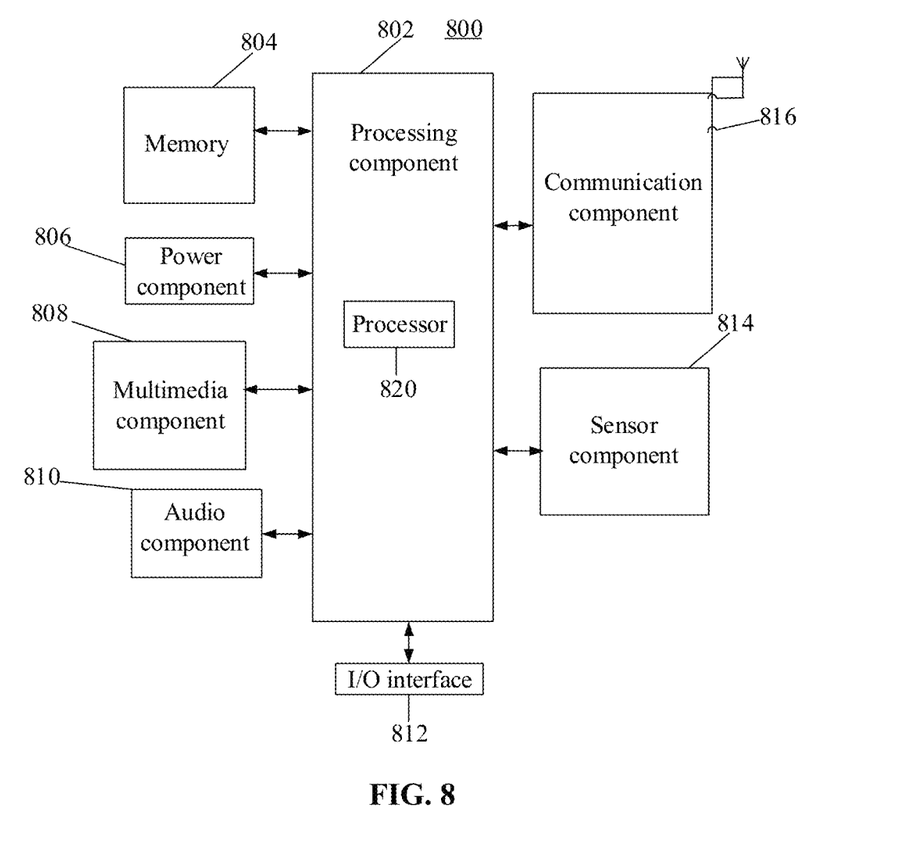
FIG. 8 is a block diagram of a device for reporting a buffer status according to an exemplary embodiment.

FIG. 8 is a block diagram of a device for reporting a buffer status according to an exemplary embodiment. For example, the device 800 may be a mobile phone, a computer, a digital broadcast terminal, a messaging device, a gaming console, a tablet, a medical device, exercise equipment, a personal digital assistant and the like.

Referring to FIG. 8, the device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the abovementioned method. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operation of the device 800. Examples of such data include instructions for any application programs or methods operated on the device 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the device 800. The power component 806 may include a power management system, one or more power supplies, and other components associated with generation, management and distribution of power for the device 800.

The multimedia component 808 includes a screen providing an output interface between the device 800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the device 800 is in the operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and a peripheral interface module, and the peripheral interface module may be a keyboard, a click wheel, buttons and the like. The buttons may include, but not limited to: a home button, a volume button, a starting button and a locking button.

The sensor component 814 includes one or more sensors configured to provide status assessment in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the device 800 and other equipment. The device 800 may access a communication-standard-based wireless network, such as a Wireless Fidelity (WiFi) network, a 2nd-Generation (2G) or 3rd-Generation (3G) network or a combination thereof. In an exemplary embodiment, the communication component 816 receives a broadcast signal or broadcast associated information from an external broadcast management system through a broadcast channel. In an exemplary embodiment, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 800 may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 804 including an instruction, and the instruction may be executed by the processor 820 of the device 800 to implement the abovementioned method. For example, the non-transitory computer-readable storage medium may be a ROM, a Random Access Memory (RAM), a Compact Disc Read-Only Memory (CD-ROM), a magnetic tape, a floppy disc, optical data storage equipment and the like.

The device embodiments substantially correspond to the method embodiments, and thus related parts refer to part of descriptions of the method embodiments. The device embodiments described above are only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the embodiments. Those of ordinary skill in the art may understand and implement without creative work.

It is to be noted that relational terms "first", "second" and the like in the present disclosure are adopted only to distinguish one entity or operation from another entity or operation and not always to require or imply existence of any such practical relationship or sequence between the entities or operations. Terms "include" and "have" or any other variation thereof is intended to cover nonexclusive inclusions, so that a process, method, object or device including a series of elements not only includes those elements, but also includes other elements that are not clearly listed, or further includes elements intrinsic to the process, the method, the object or the device. Under the condition of no more limitations, an element defined by statement "including a/an . . . " does not exclude existence of another element that is the same in a process, method, object or device including the element.

The method and device provided in the embodiments of the present disclosure are introduced above in detail. The principle and implementation modes of the present disclosure are elaborated in the specification with specific examples. The embodiments are described above only to help the method of the present disclosure and the core concept thereof to be understood. In addition, those of ordinary skill in the art may make variations to the specific implementation modes and the scope of application according to the concept of the present disclosure. To sum up, the contents of the specification should not be understood as limits to the present disclosure.

The invention claimed is:

1. A method for reporting a buffer status, comprising:
   determining a logical channel or a logical channel group satisfying a Buffer Status Report (BSR) triggering condition;
   in response to that the determined logical channel or the determined logical channel group corresponds to a Data Radio Bearer (DRB) mapped by a Service Data Adaptation Protocol (SDAP) entity, reporting, to a base station, a BSR comprising a buffer of the SDAP entity mapped to the determined logical channel or the determined logical channel group; and
   in a case of reporting to the base station the BSR comprising the buffer of the SDAP entity mapped to the determined logical channel or the determined logical channel group, indicating, by the SDAP entity, data available for transmission of the SDAP entity to a Media Access Control (MAC) entity mapped by the determined logical channel.

2. The method of claim 1, further comprising:
   in response to that it is detected that the DRB mapped by the SDAP entity changes, triggering the BSR; and
   reporting the BSR to the base station.

3. The method of claim 2, wherein said triggering the BSR comprises:
   in response to that it is determined that the SDAP entity has buffer data, triggering the BSR after it is detected that the DRB mapped by the SDAP entity changes.

4. The method of claim 2, wherein said triggering the BSR comprises:
   determining a logical channel or a logical channel group corresponding to the DRB before changing, and determining a logical channel or a logical channel group corresponding to the DRB after changing; and
   triggering BSR of the determined logical channel or the determined logical channel group corresponding to the DRB before changing and BSR of the determined logical channel or logical channel group corresponding to the DRB after changing.

5. The method of claim 3, wherein said triggering the BSR comprises:
   determining a logical channel or a logical channel group corresponding to the DRB before changing, and a logical channel or a logical channel group corresponding to the DRB after changing; and
   triggering BSR of the determined logical channel or the determined logical channel group corresponding to the DRB before changing and BSR of the determined logical channel or logical channel group corresponding to the DRB after changing.

6. The method of claim 1, wherein said indicating, by the SDAP entity, the data available for transmission of the SDAP entity to the MAC entity mapped by the determined logical channel comprises:
   indicating, by the SDAP entity, the data available for transmission of the SDAP entity to the MAC entity mapped by the determined logical channel according to an indication rule of data available for transmission of a Packet Data Convergence Protocol (PDCP) entity corresponding to the DRB.

7. The method of claim 6, wherein said indicating, by the SDAP entity, the data available for transmission to the MAC entity mapped by the determined logical channel comprises:
   indicating, by the SDAP entity, the data available for transmission of the SDAP entity to a Packet Data Convergence Protocol (PDCP) entity corresponding to the DRB; and
   deeming, by the PDCP entity, the data available for transmission of the SDAP entity as part of data available for transmission of the PDCP entity, and indicating, by the SDAP entity, the data available for transmission of the PDCP entity to the MAC entity mapped by the determined logical channel according to the indication rule of the data available for transmission of the PDCP entity.

8. The method of claim 6, wherein said indicating, by the SDAP entity, the data available for transmission of the SDAP entity to the MAC entity mapped by the determined logical channel according to the indication rule of the data available for transmission of the PDCP entity corresponding to the DRB comprises:
   in response to that the PDCP entity deems that the data available for transmission of the PDCP entity belongs to a first logical channel in the DRB, and indicates the data available for transmission of the PDCP entity to a MAC entity corresponding to the first logical channel, indicating, by the SDAP entity, the data available for transmission of the SDAP entity to the MAC entity corresponding to the first logical channel; or
   in response to that the PDCP entity deems that the data available for transmission of the PDCP entity belongs to a second logical channel in the DRB, and indicates the data available for transmission of the PDCP entity to a MAC entity corresponding to the second logical channel, indicating, by the SDAP entity, the data available for transmission of the SDAP entity to the MAC entity corresponding to the second logical channel; or
   in response to that the PDCP entity deems that the data available for transmission of the PDCP entity belongs to both a first logical channel and a second logical channel in the DRB, and simultaneously indicates the data available for transmission of the PDCP entity to a MAC entity corresponding to the first logical channel and a MAC entity corresponding to the second logical channel, simultaneously indicating, by the SDAP entity, the data available for transmission of the SDAP entity to the MAC entity corresponding to the first logical channel and the MAC entity corresponding to the second logical channel.

9. The method of claim 6, wherein the data available for transmission of the SDAP entity comprises at least one of an SDAP Service Data Unit (SDU), an SDAP Packet Data Unit (PDU) or an SDAP control PDU.

10. A User Equipment (UE) device, comprising:
    a processor;
    a memory configured to store an instruction executable for the processor,
    wherein the processor is configured to:
       determine a logical channel or a logical channel group satisfying a Buffer Status Report (BSR) triggering condition;
       in response to that the determined logical channel or the determined logical channel group corresponds to a Data Radio Bearer (DRB) mapped by a Service Data Adaptation Protocol (SDAP) entity, report to a base station a BSR comprising a buffer of the SDAP entity mapped to the determined logical channel or the determined logical channel group; and
       in a case of reporting to the base station the BSR comprising the buffer of the SDAP entity mapped to the determined logical channel or the determined logical channel group, indicate, by the SDAP entity, data available for transmission of the SDAP entity to a Media Access Control (MAC) entity mapped by the determined logical channel.

11. A non-transitory computer-readable storage medium having stored a computer program that when being executed by a processor, implements a method for reporting a buffer status, the method comprising:
    determining a logical channel or a logical channel group satisfying a Buffer Status Report (BSR) triggering condition;
    in response to that the determined logical channel or the determined logical channel group corresponds to a Data Radio Bearer (DRB) mapped by a Service Data Adaptation Protocol (SDAP) entity, reporting, to a base station, a BSR comprising a buffer of the SDAP entity mapped to the determined logical channel or the determined logical channel group; and
    in a case of reporting to the base station the BSR comprising the buffer of the SDAP entity mapped to the determined logical channel or the determined logical channel group, indicating, by the SDAP entity, data available for transmission of the SDAP entity to a Media Access Control (MAC) entity mapped by the determined logical channel.

12. The device of claim 10, wherein the processor is further configured to:
    in response to that it is detected that the DRB mapped by the SDAP entity changes, trigger the BSR; and
    report the BSR triggered by the detection triggering module to the base station.

13. The device of claim 12, wherein the processor is configured to:
    in response to that it is determined that the SDAP entity has buffer data, trigger the BSR after it is detected that the DRB mapped by the SDAP entity changes.

14. The device of claim 12, wherein the processor is configured to:
    determine a logical channel or a logical channel group corresponding to the DRB before changing and a logical channel or a logical channel group corresponding to the DRB after changing; and
    trigger BSR of the determined logical channel or the determined logical channel group corresponding to the DRB before changing and BSR of the determined logical channel or the determined logical channel group corresponding to the DRB after changing.

15. The device of claim 10, wherein the processor is further configured to:
    in the case that the first reporting module reports to the base station the BSR comprising the buffer of the SDAP entity mapped to the determined logical channel or the determined logical channel group, indicate data available for transmission of the SDAP entity to a Media Access Control (MAC) entity mapped by the determined logical channel.

16. The device of claim 15, wherein the processor is configured to:
    indicate the data available for transmission of the SDAP entity to the MAC entity mapped by the determined logical channel according to an indication rule of data available for transmission of a Packet Data Convergence Protocol (PDCP) entity corresponding to the DRB.

17. The device of claim 15, wherein the processor is configured to:
    indicate the data available for transmission of the SDAP entity to a Packet Data Convergence Protocol (PDCP) entity corresponding to the DRB;
    deem the data available for transmission of the SDAP entity as part of data available for transmission of the PDCP entity; and
    indicate the data available for transmission of the PDCP entity to the MAC entity mapped by the determined logical channel according to the indication rule of the data available for transmission of the PDCP entity.

18. The device of claim 16, wherein the processor is configured to:
    in response to that the PDCP entity deems that the data available for transmission of the PDCP entity belongs to a first logical channel in the DRB, and indicates the data available for transmission of the PDCP entity to a MAC entity corresponding to the first logical channel, indicate the data available for transmission of the SDAP entity to a MAC entity corresponding to the first logical channel; or
    in response to that the PDCP entity deems that the data available for transmission of the PDCP entity belongs to a second logical channel in the DRB, and indicates the data available for transmission of the PDCP entity to a MAC entity corresponding to the second logical channel, indicate the data available for transmission of the SDAP entity to the MAC entity corresponding to the second logical channel; or
    in response to that the PDCP entity deems that the data available for transmission of the PDCP entity belongs to both a first logical channel and a second logical channel in the DRB and simultaneously indicates the data available for transmission of the PDCP entity to a MAC entity corresponding to the first logical channel and a MAC entity corresponding to the second logical channel, simultaneously indicate the data available for transmission of the SDAP entity to the MAC entity corresponding to the first logical channel and the MAC entity corresponding to the second logical channel.

19. The device of claim 15, wherein the data available for transmission of the SDAP entity comprises at least one of an SDAP Service Data Unit (SDU), an SDAP Packet Data Unit (PDU) or an SDAP control PDU.

* * * * *